United States Patent
Enyedi et al.

(10) Patent No.: US 11,356,248 B2
(45) Date of Patent: Jun. 7, 2022

(54) STREAM CIPHERING

(71) Applicant: Telefonaktiebolaget LM Ericsson (publ), Stockholm (SE)

(72) Inventors: Gabor Sandor Enyedi, Budapest (HU); Zoltan Kiss, Budapest (HU); Gergely Pongrácz, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 239 days.

(21) Appl. No.: 16/770,167

(22) PCT Filed: Dec. 21, 2017

(86) PCT No.: PCT/EP2017/084009
§ 371 (c)(1),
(2) Date: Jun. 5, 2020

(87) PCT Pub. No.: WO2019/120533
PCT Pub. Date: Jun. 27, 2019

(65) Prior Publication Data
US 2020/0396062 A1   Dec. 17, 2020

(51) Int. Cl.
*H04L 9/06* (2006.01)
*H04L 9/08* (2006.01)

(52) U.S. Cl.
CPC .......... *H04L 9/0656* (2013.01); *H04L 9/0869* (2013.01); *H04L 2209/20* (2013.01)

(58) Field of Classification Search
CPC . H04L 9/0656; H04L 9/0869; H04L 2209/20; H04L 2209/34
See application file for complete search history.

(56) References Cited

U.S. PATENT DOCUMENTS

2008/0095370 A1* 4/2008 Rose ..................... H04L 9/0662
380/278

FOREIGN PATENT DOCUMENTS

EP   1049288 A2   11/2000
WO   2008049046 A2   4/2008

OTHER PUBLICATIONS

Katzenbeisser, S. et al., "Combining Tardos Fingerprinting Codes and Fingercasting", Lecture Notes in Computer Science: International Workshop on Information Hiding, vol. 4567, Jan. 1, 2007, pp. 294-310, Springer.

(Continued)

*Primary Examiner* — Jung W Kim
*Assistant Examiner* — Sangseok Park
(74) *Attorney, Agent, or Firm* — Christopher & Weisberg, P.A.

(57) ABSTRACT

A technique for ciphering source data (306) into target data (308) is described. As to a method aspect of the technique, a level (302) of ciphering is determined for the source data (306). A key sequence (304) is generated depending on the determined level (302) of ciphering. The source data (306) and the key sequence (304) are combined resulting in the target data (308).

20 Claims, 12 Drawing Sheets

(56) References Cited

OTHER PUBLICATIONS

3rd Generation Partnership Project, "3rd Generation Partnership Project; Technical Specification Group Services and System Aspects; 3G Security; Specification of the MILENAGE Algorithm Set: An Example Algorithm Set for the 3GPP Authentication and Key Generation Functions f1, f1*, f2, f3, f4, f5 and f5*; Document 2: Algorithm Specification (Release 14)", Technical Specification, 3GPP TS 35.206 V14.0.0, Mar. 1, 2017, pp. 1-31, 3GPP.

3rd Generation Partnership Project, "3rd Generation Partnership Project; Technical Specification Group Services and System Aspects; 3G Security; Specification of the MILENAGE Algorithm Set: An Example Algorithm Set for the 3GPP Authentication and Key Generation Functions f1, f1*, f2, f3, f4, f5 and f5*; Document 3: Implementors' Test Data (Release 14)", Technical Specification, 3GPP TS 35.207 V14.0.0, Mar. 1, 2017, pp. 1-19, 3GPP.

3rd Generation Partnership Project, "3rd Generation Partnership Project; Technical Specification Group Services and System Aspects; 3G Security; Specification of the MILENAGE Algorithm Set: An Example Algorithm Set for the 3GPP Authentication and Key Generation Functions f1, f1*, f2, f3, f4, f5 and f5*; Document 4: Design Conformance Test Data (Release 14)", Technical Specification, 3GPP TS 35.208 V14.0.0, Mar. 1, 2017, pp. 1-17, 3GPP.

3rd Generation Partnership Project, "3rd Generation Partnership Project; Technical Specification Group Services and System Aspects; Specification of the 3GPP Confidentiality and Integrity Algorithms UEA2 & UIA2; Document 2: SNOW 3G Specification (Release 14)", Technical Specification, 3GPP TS 35.216 V14.0.0, Mar. 1, 2017, pp. 1-6, 3GPP.

3rd Generation Partnership Project, "3rd Generation Partnership Project; Technical Specification Group Services and System Aspects; Security Related Network Functions (Release 14)", Technical Specification, 3GPP TS 43.020 V14.0.0, Sep. 1, 2016, pp. 1-126, 3GPP.

3rd Generation Partnership Project, "3rd Generation Partnership Project; Technical Specification Group Services and System Aspects; Specification of A8_V MILENAGE Algorithm: An Example Algorithm for the Key Generation Function A8_V (Release 14)", Technical Specification, 3GPP TS 55.236 V14.0.0, Mar. 1, 2017, pp. 1-12, 3GPP.

3rd Generation Partnership Project, "3rd Generation Partnership Project; Technical Specification Group Services and System Aspects; Vocabulary for 3GPP Specifications (Release 14)", Technical Report, 3GPP TR 21.905 V14.0.0, Mar. 1, 2017, pp. 1-66, 3GPP.

Gouget, A. et al., "Analysis of the Bit-Search Generator and Sequence Compression Techniques", Lecture Notes in Computer Science: Fast Software Encryption, vol. 3557, Jan. 1, 2005, pp. 196-214, Springer.

* cited by examiner

800

STREAM CIPHERING

TECHNICAL FIELD

The present disclosure generally relates to a technique for ciphering data. More specifically and without limitation, a method and a device are provided for ciphering data that is transmitted or received in a radio access network (RAN).

BACKGROUND

Networks, especially mobile networks, use encryption for protecting the data transported in the network. In some cases, the encryption is essential to protect sensitive information such as financial transactions. In most of the cases, the data is not sensitive at all, and the sole purpose of the encryption is to make it hard to track the traffic.

While voice traffic in mobile networks is always sensitive and needs strong encryption, the amount of voice traffic is insignificant in 4G and 5G networks such as Third Generation Partnership Project (3GPP) Long Term Evolution (LTE) and 3GPP New Radio (NR) networks. Thus, voice traffic can be encrypted by a computationally demanding encryption.

Most data traffic on mobile networks is an example for the case, in which strong encryption is not needed. However, existing networks encrypt all transferred data using a strong and computationally expensive encryption on the radio interface (colloquially referred to as "air interface" encryption or "aircrypto") and at other points of the network.

Sensitive traffic is only kept safe, if endpoint encryption (i.e., end-to-end encryption) is applied, in which case any other encryption such as aircrypto is completely useless. For non-sensitive traffic not subjected to endpoint encryption it is enough to make it hard, but not impossible, to be eavesdropped by protecting some parts of the network. Furthermore, since such non-sensitive traffic is forwarded through the Internet without encryption, it would be disproportionate to provide more protection for such traffic in the mobile network (e.g., on the air interface) than the traffic has outside of the mobile network.

Stream cyphering is a well-known way of encryption, which generates some pseudorandom key stream and produces the ciphertext by combining the plaintext with the key stream. Combining typically includes a per-bit XOR operation. Since the key stream simulates a random stream, bits of the plaintext are randomly flipped.

For stream ciphers, encryption is equivalent to decryption. Since the plaintext was combined with the key stream using an invertible operation such as XOR, the decryptor just needs to produce the very same key stream from a shared secret key and combine it with the ciphertext using the inverse operation. Since the inverse operation of XOR is XOR, there is typically no difference between the encryptor and the decryptor, for which reason decryption is not described in detail in this document.

Existing networks use either no encryption or a strong encryption, such as Snow3G according to the document 3GPP TS 35.216, Version 14.0.0 or the Advanced Encryption Standard (AES) according to the document Processing Standards Publication 197, which are computationally expensive.

One approach could apply a weak but fast encryption to non-sensitive data. However, breaking a weak encryption typically reveals the secret key, so that not only a portion of a message or stream but the entire communication is decrypted. Furthermore, selectively using either a slow but strong or a fast but breakable encryption provides no way to gradually change the strength of the encryption.

SUMMARY

Accordingly, there is a need for a ciphering technique that allows changing the strength of the ciphering. More specifically, there is a need for a technique that reduces the computational complexity of the ciphering. Alternatively or in addition, there is a need for a technique that allows selectively reducing the computational complexity of the ciphering without increasing the risk of breaking the ciphering based on a portion of ciphertext.

As to one aspect, a method of ciphering source data into target data is provided. The method comprises or triggers a step of determining a level of ciphering for the source data. The method further comprises or triggers a step of generating a key sequence depending on the determined level of ciphering. The method further comprises or triggers a step of combining the source data and the key sequence resulting in the target data.

The technique may be implemented as a method of controlling the level of ciphering. Particularly, the method may be implemented by adjusting the level of ciphering to a level of sensitivity for the data.

By controlling the generating of the key sequence depending on the level of ciphering, the strength of the ciphering (e.g., encryption and/or decryption) can be changed. By determining the level of ciphering, the same amount of source data can be ciphered with less computational complexity in at least some embodiments. Same or further embodiments may distinguish data traffic for determining the level of ciphering. The data may be distinguished based on sensitivity or at least two types of traffic associated with different levels of ciphering.

Embodiments of the technique allow selectively reducing the computational complexity of the ciphering without increasing the risk of breaking the ciphering based on a portion of ciphertext.

The generating of the key sequence may be initialized by a secret key (which may also be referred to as a seed, a seed key or an initial value). For example, the entire key sequence cannot be reproduced without the secret key. If an attacker has some plaintext and its encrypted representation (i.e., the corresponding ciphertext), the ciphering is not broken in the sense that the secret key cannot be inferred. While a portion of the key sequence used for encrypting the plaintext can be revealed if both the plaintext and its encrypted version in the ciphertext are acquired somehow for the corresponding portion, the revealed portion of the key sequence is only a fraction of the full period of the key sequence generated from the secret key.

Hence, even if a portion (e.g., some bits) of the key sequence are revealed somehow, the internal state of the key sequence generating module cannot be inferred and no further bits of the key sequence can be reproduced.

The level of ciphering may be changed by the determining step without reseeding the generating of the key sequence.

The level of ciphering may comprise, or may be indicative of, a key entropy of the key sequence. The key entropy may also be referred to as an entropy density of the key sequence or a key entropy density. The key entropy may be the entropy of the key sequence per bit. The entropy may encompass at least one of the Hartley entropy and the Shannon entropy. For example, m bits, m>0, of the key sequence may be distributed according to a probability distribution p(x), x=0 ... $2^m-1$. The key entropy may be the entropy according to the probability distribution divided by the number of m bits, e.g.:

$$H=-[p(0)\cdot\log p(0)+\ldots+p(2^m-1)\cdot\log p(2^m-1)]/m.$$

The determined key entropy for the key sequence may be less than 1.

Different bits in the key sequence may be correlated, e.g., depending on at least one of the determined key entropy and the determined level of ciphering. Alternatively or in addition, different bits in the key sequence may be differently probability-distributed, e.g., depending on at least one of the determined key entropy and the determined level of ciphering. For example, the different bits are not identically distributed, i.e., the probability of one bit for being set to 1 is different from the probability of another bit for being set to 1. Alternatively or in addition, a probability of a bit in the key sequence for being set to 1 deviates (e.g., substantially) from ½ (i.e., 0.5) depending on at least one of the determined key entropy and the determined level of ciphering. At least one of the bits in the key sequence may be unequally probability-distributed for being set to either 0 or 1. The probability distribution of at least one of the bits in the key sequence may be biased. For at least one of the bits in the key sequence, the probability p(0) for being set to 0 may be different from the probability p(1) for being set to 1. For example, the probability p(1) is not ½.

For example, if m bits, m>0, of the key sequence are identically and independently distributed according to a probability distribution $p([x_0,\ldots,x_{m-1}])=p(x_0)\ldots p(x_{m-1})$, $x_j=0$ or 1 for j=0 ... m-1, the key entropy may be $H=-p(0)\cdot\log p(0)-(1-p(0))\cdot\log(1-p(0))$.

The key sequence may comprise key symbols, e.g., out of a key symbol alphabet. A bit length of the key symbols may be the same for all key symbols in the key symbol alphabet.

The key sequence may be a sequence of the key symbols. Consecutive key symbols may be concatenated in the key sequence bit on bit.

At least one of a cardinality of the key symbol alphabet and a bit length of the key symbols may depend on at least one of the determined key entropy and the determined level of ciphering. The key entropy may be log C/m for the bit length m of the key symbols and the cardinality C of the key symbol alphabet.

The key entropy may be an increasing function of the cardinality of the key symbol alphabet and/or a decreasing function of the bit length of the key symbols.

The determined key entropy may define a ratio between a logarithm of the cardinality of the key symbol alphabet and the bit length of the key symbols. The cardinality, C, of the key symbol alphabet may be less than $2^m$, wherein m may be the bit length of the key symbols.

The step of generating the key sequence may comprise at least one of a substeps of generating a generator sequence according to a generator entropy; and a substeps of mapping generator symbols of the generator sequence to key symbols of the key sequence. The generator entropy may be greater than the determined key entropy.

The generator entropy may be a statistical feature of the generator sequence or a generator generating the generator sequence. Alternatively or in addition, the generator symbols (e.g., a generator symbol alphabet comprising the generator symbols) may be a feature of the mapping.

The generator may be a random number generator. The level of ciphering may be changed by the determining step without reseeding the generator generating the generator sequence.

The mapping may be injective. For example, the mapping may be bijective. A generator symbol alphabet comprising all of the generator symbols may be mapped onto the key symbol alphabet. A number of different generator symbols, i.e., a cardinality of the generator symbol alphabet, may be equal to the cardinality of the key symbol alphabet.

The generator sequence may be a one-time pad and/or may have maximum entropy. The generator for generating the generator sequence may be initialized by a secret key (which may also be referred to as a seed, a seed key or an initial value). The generator sequence may approximate or correspond to a random sequence. For example, each bit in the generator sequence may take 0 or 1 with 50% probability, which is also referred to as condition 1. Furthermore, different bits in the generator sequence may be identically distributed and uncorrelated, which is referred to as condition 2. Such a generator sequence may have maximum entropy, i.e., the entropy (e.g., using the binary logarithm) may be equal to the number of bits in the generator sequence, or equivalently, the entropy per bit may be 1. While the generator sequence may fulfill both conditions 1 and 2, the key sequence may violate at least one of the conditions 1 and 2 depending on the level of ciphering and/or to meet the determined key entropy.

An exemplary XOR operation for implementing the combining of the key sequence with the plaintext may include leaving a plaintext bit unchanged if the associated bit in the key sequence is set to 0, and inverting or flipping the plaintext bit if the associated bit in the key sequence is set to 1. For example, if the key sequence fulfills condition 1, each bit of the ciphertext is inverted or flipped relative to the plaintext by 50% chance. Alternatively or in combination, if the key sequence fulfills condition 2, different bits (more precisely: different bit positions) of the ciphertext are independently inverted or flipped.

In a first embodiment, the bit length of the generator symbols may be the same for all generator symbols in the generator symbol alphabet, which may also be referred to as a fixed length. The generator symbols may be code words of a prefix code. A generator symbol alphabet comprising all of the generator symbols may fulfill a prefix condition, i.e., may be prefix-free.

In a second embodiment, bit lengths of the generator symbols are different. The bit length of the generator symbols may be different for at least some of the generator symbols in the generator symbol alphabet, which may also be referred to as a variable length.

An average bit length of the generator symbols may be less than the bit length of the key symbols. The key entropy may define a ratio between the average bit length of the generator symbols and the bit length of the key symbols.

The generator entropy may be equal to or approximate a maximum entropy. The maximum entropy may be 1, e.g., in units of entropy per bit.

A length of a seed key for initializing the generating step (e.g., for initializing the generator generating the generator sequence) and/or a length of a period of the generating step (e.g., a period of the generator generating the generator sequence) may be unchanged (e.g., not reduced) when at least one of the level of ciphering or the key entropy is changed (e.g., reduced).

Herein, the expression ciphering may comprise at least one of enciphering or encrypting and deciphering or decrypting. The source data may comprise plaintext, and the target data may comprise ciphertext, or vice versa. The plaintext may comprise an audio signal and/or video signal, e.g., a voice part of a phone call.

A cipher performing the method may be a block cipher or a stream cipher. A source data block, a target data block and a key block may comprise the source data, the target data and the key sequence, respectively. For a stream cipher, a source stream, a target stream and a key stream may comprise the source data, the target data and the key sequence, respectively.

At least one of the source data, the target data and a control message may be indicative of the level of ciphering.

The technique may be implemented in a radio access network (RAN). The method may be performed by a base station or a cell of the RAN. The base station may encompass any station that is configured to provide radio access to one or more radio devices. A base station or a cell of the RAN may serve a plurality of radio devices. Examples for the base station may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

Alternatively or in addition, the technique may be implemented in a radio device. The radio device may be configured for peer-to-peer communication (e.g., on a sidelink) and/or for accessing the RAN (e.g. an UL and/or downlink, DL). The radio device may be a user equipment (UE, e.g., a 3GPP UE), a mobile or portable station (STA, e.g. a Wi-Fi STA), a device for machine-type communication (MTC), a narrowband Internet of Things (NB-IoT) device or a combination thereof. Examples for the UE and the mobile station include a mobile phone and a tablet computer. Examples for the portable station include a laptop computer and a television set. Examples for the MTC device include robots, sensors and/or actuators, e.g., in manufacturing, automotive communication and home automation. The MTC device may be implemented in household appliances and consumer electronics. Examples for the combination include a self-driving vehicle, a door intercommunication system and an automated teller machine.

The technique may be implemented on a Physical Layer (PHY), a Medium Access Control (MAC) layer, a Radio Link Control (RLC) layer and/or a Radio Resource Control (RRC) layer of a protocol stack for the radio communication.

The level of ciphering may be determined in a range comprising an infinite dilution (i.e. using 0 bit from a generator stream) and no dilution (i.e., complete encryption by using one byte of the generator stream for each byte of the plaintext). Using less than 8 bits of the generator stream per byte of the plaintext according to the level of ciphering means that some information is not completely hidden, so that the determining step allows controlling the ciphering between complete encryption and no encryption. The technique allows gradually controlling a tradeoff between ciphering rate and security.

The generator symbols may comprise a fixed number of n bits. Each portion of m bits of the plaintext may be ciphered using n bits of the generator sequence, wherein n<m. For example, an m-bit long number, i.e., the key symbol, is assigned for each n-bit long number, i.e. the generator symbol. The assignment is stored (as the mapping of the dilution) in an array with $2^n$ entries. The key sequence is generated by taking n bit long numbers from the generator sequence and converting them to the assigned m-bit long numbers using the array.

One implementation may map the n bits of the generator symbol to the m bits of the key symbol by interpreting the generator symbol as an m-bit long number. Another implementation that assigns a non-zero bit flipping probability to each of the m bit positions (e.g., by fulfilling the condition 2) provides better protection to the upper bits of the plaintext portion.

For example, for defining the key symbols, i.e., for defining a key symbol alphabet of m-bit long numbers, first all the m-bit long numbers with all bits set to zero (1 such number exists) may be included in the key symbol alphabet. Second, all m-bit numbers with exactly one bit set to 1 may be included in the key symbol alphabet. Third, all m-bit numbers with exactly two bits set to 1 may be included in the key symbol alphabet, and so on, as long as all the $2^n$ entries of the array are filled. The key symbol alphabet may result in a key sequence, wherein some bits (i.e., some of the m different bit positions) have slightly higher probability to be set to 1 than others. This may be avoided or reduced by changing the array, e.g. regularly triggered by an event or periodically. For example, the change may be triggered by some bits in the plaintext or some bits of the generator sequence.

Moreover, different generator symbols may comprise different numbers of bits. Each portion of m bits of the plaintext may be ciphered using on average n bits of the generator sequence, wherein n<m. A probability is assigned to each of the m-bit long key symbols, so that the sum of the probabilities is 1. Based on this probability distribution for the key symbols, a Huffman code may be defined as the mapping. The generator symbols may be the prefix code words of the Huffman code. If a compressor belonging to that Huffman code would get the m-bit long numbers as input according to the probability distribution, the compressor would produce an output with per-bit-entropy being 1. A decompressor of the Huffman code would output (e.g., approximately) the key symbols according to the probability distribution, if the decompressor gets the generator sequence with a per-bit-entropy being 1. Thus, the step of generating the key sequence may be implemented by inputting the generator sequence into a decompressor defined by the Huffman code that is defined by the probability distribution.

The mapping using generator symbols with varying bit length may be used for a key symbol alphabet comprising a number of C key symbols, wherein C is not a power of 2. For example, the number, C, of bytes having at most q bits set to 1 is not always a power of 2. Alternatively or in addition, the mapping using generator symbols with varying bit length may approximate an unbiased bit flip probability for each of the m bits, i.e., an identical probability distribution for different bit positions to be changed is ½ (i.e., condition 1). Alternatively or in addition, the mapping using generator symbols with varying bit length may approximate or provide a probability distribution of the key symbols, so that each bit (i.e., each of the m bit positions) has independent and equal probability to be changed in the ciphertext (i.e., condition 2).

In order to determine the key entropy, i.e., controlling the key entropy to a value other than 1. At least one of the conditions may be violated by the Huffman code defining the mapping. For example, the bit flip probability, i.e., the probability for bits being 0 or 1 in the key sequence, is not 0.5 (i.e., violating condition 1).

A mapping using generator symbols with a fixed number of n bits for generating the key symbols with m bits may be performed in parallel (e.g., simultaneously) for different key symbols. A mapping using generator symbols with varying lengths (e.g., a prefix code) may be performed sequentially, e.g. to find the beginning of the next generator symbol in the generator sequence.

Moreover, implementing a mapping with varying length may result in huge arrays. Referring to the longest bit length of the longest generator symbol (e.g., the longest code word of a prefix code) by $n_{max}$, the array may comprise $2^{n_{max}}$ entries. If such an array cannot fit into a level 1 (L1) cache of a processor or core, the mapping may be performed including significant waiting cycles of the processor or core. On the other hand, a subset of short generator symbols may be represented by a shorter table that fits in the L1 cache. For example, tables with $2^8$ to $2^{16}$ entries for each level of a Huffman tree may be implemented, since the first level of the Huffman tree may fit into the L1 cache.

The technique may enable a varying encryption strength by determining the level of ciphering. Some parts of a message may be more important or sensitive than others. For example, a header or a beginning of a data packet (e.g., at any network layer) may be ciphered using a higher level of ciphering than the level of ciphering determined for the payload of the data packet. The header or the beginning of the data packet may be essential for machine-interpretation of the data packet. A portion of the source data comprising the header may be determined by packet inspect. Alternatively or in addition, for a first part (e.g., the first 128 bytes of a data packet) a higher ciphering layer may be determined than the ciphering layer for the rest of the data packet.

The determining of the ciphering level may be supported by a protocol layer. For example, a protocol layer may trigger a change of the ciphering level (i.e., the encryption strength may be changed). The ciphering level may be determined or changed within a message. For example, the generator sequence may be used directly (i.e., without dilution) in the combining step for the most important parts of a message, and the determining step reduces the ciphering level for the rest of the message.

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., via the RAN and/or via the Internet and/or by the base station. Alternatively or in addition, the method may be encoded in a Field-Programmable Gate Array (FPGA) and/or an Application-Specific Integrated Circuit (ASIC), or the functionality may be provided for download by means of a hardware description language.

As to one device aspect, a device for ciphering source data into target data is provided. The device is configured to perform the method aspect. Alternatively or in addition, the device may comprise a determining unit configured to determine a level of ciphering for the source data. The device may further comprise a generating unit configured to generate a key sequence depending on the determined level of ciphering. The device may further comprise a combining unit configured to combine the source data and the key sequence resulting in the target data.

As to a further device aspect, a device for ciphering source data into target data, is provided. The device comprises at least one processor and a memory. Said memory comprises instructions executable by said at least one processor whereby the device is operative to determine a level of ciphering for the source data. Execution of the instructions further causes the device to be operative to generate a key sequence depending on the determined level of ciphering. Execution of the instructions further causes the device to be operative to combine the source data and the key sequence resulting in the target data.

The device (or any node or station for embodying the technique) may further include any feature disclosed in the context of the method aspect. Particularly, any one of the units and modules, or a dedicated unit or module, may be configured to perform or trigger one or more of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP LTE or a successor thereof, Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
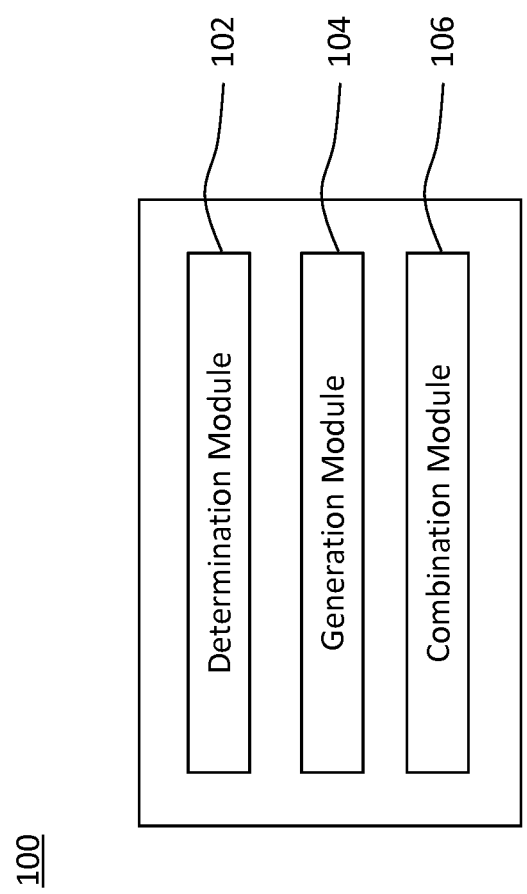
FIG. 1 shows a schematic block diagram of a device for ciphering source data into target data.

FIG. 1 schematically illustrates a block diagram of a device for ciphering source data into target data. The device is generically referred to by reference sign 100. The device 100 may also be referred to as a cipher, e.g., a stream cipher.

The device 100 comprises a determination module 102 that determines a level of ciphering for the source data. The device 100 further comprises a generation module 104 that generates a key sequence depending on the determined level of ciphering. The device 100 further comprises a combination module 106 that combines the source data and the key sequence resulting in the target data.

The generation module 104 may also be referred to as a controlled generator. Generating the key sequence may be controlled by the level of ciphering as a control command or control parameter. The combination module 106 may also be referred to as a combiner. The key sequence may also be referred to as a cipher key.

The level of ciphering may be a key entropy for the key sequence. The key entropy may be or may control the entropy of the generated key sequence, e.g., the entropy of the key sequence per bit for a stream cipher or per bit or block for a block cipher. The determination module 102 may also be referred to as an entropy controller.

Any of the modules of the device 100 may be implemented by units configured to provide the corresponding functionality.

In a receiver implementation of the device 100, e.g., for aircrypto, the source data may be plaintext to be encrypted and the target data may be ciphertext (also referred to as ciphered data). The plaintext may arrive or become available at the receiver implementation of the device 100, e.g., provided by higher layers of a protocol stack. Vice versa, in a transmitter implementation of the device 100, the source data may be the ciphertext to be decrypted and the target data may be the plaintext. The source data may be received at the receiver implementation of the device 100, e.g., through one or more lower layers of the protocol stack.

The combination module 106 may comprise any operation that injectively (e.g., bijectively) maps both the source data and the key sequence to the target data. Alternatively or in addition, the combination module 106 may comprise an injective (e.g., bijective) mapping of the source data to the target data that is its one inverse operation if (e.g., and only if) the same key sequence is applied. For example, the combination module 106 may apply an exclusive disjunction (XOR) bit by bit for combining the source data with the key sequence. The XOR operation may result in the target data.

The device 100 may be connected to and/or part of a radio access network (RAN). The device 100 may be embodied by or at a base station of the RAN, nodes connected to the RAN for controlling the base station or a combination thereof. Alternatively or in addition, the device 100 may be a radio device. The radio device may be any device that is wirelessly connectable to the RAN. Multiple embodiments of the device 100, e.g., any pair out of radio devices and base stations, may be in radio communication for transmitting and receiving the ciphered data.

The base station may encompass a network controller (e.g., a Wi-Fi access point) or a radio access node (e.g. a 3G Node B, a 4G eNodeB or a 5G gNodeB) of the RAN. The base station may be configured to provide radio access. Alternatively or in addition, the one or more radio devices may include a mobile or portable station. Each radio device may be a user equipment (UE), a device for machine-type communication (MTC) and/or a narrowband Internet of Things (NB-IoT) device. Two or more radio devices may be configured to wirelessly connect to each other, e.g., in an ad-hoc radio network or via 3GPP sidelinks.

Figure 2:
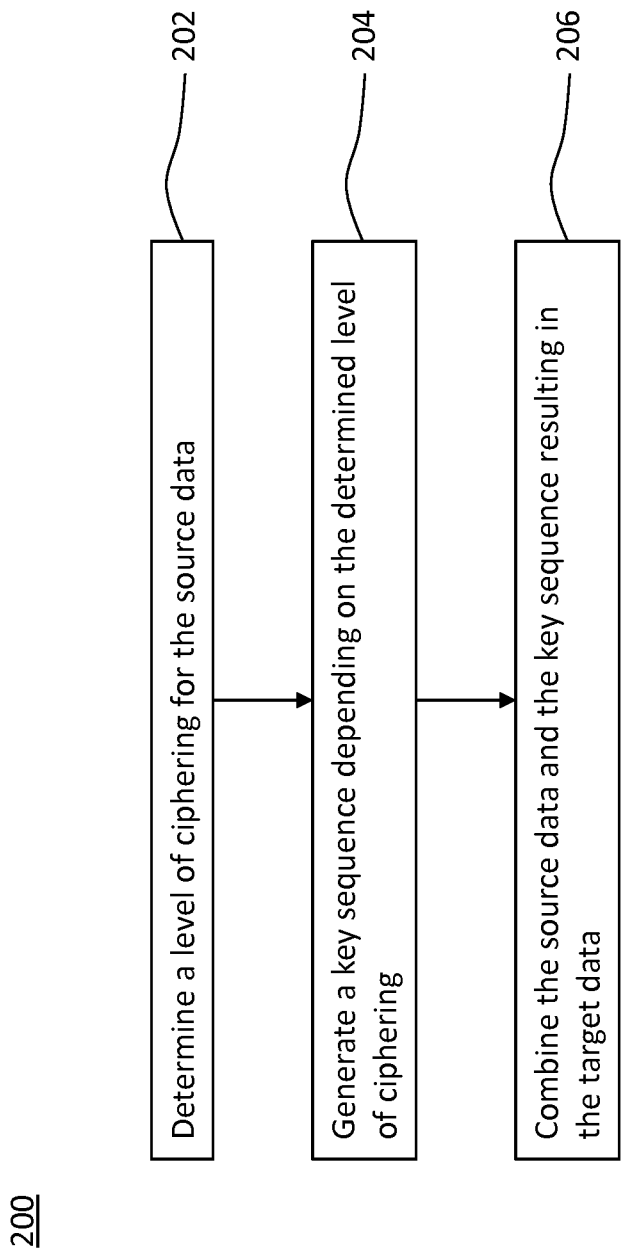
FIG. 2 shows a flowchart for a method of ciphering source data into target data, which is implementable by the device of FIG. 1.

FIG. 2 shows a flowchart for a method 200 of ciphering source data into target data. The method 200 comprises a step 202 of determining a level of ciphering for the source data. In a step 204, a key sequence is generated depending on the determined level of ciphering. The source data and the key sequence are combined in a step 206 resulting in the target data.

The method 200 may be performed by the device 100, e.g., by the base station of the RAN and/or the radio device connectable to the RAN. For example, the modules 102, 104 and 106 may perform the steps 202, 204 and 206, respectively.

Embodiments of the technique allow changing (e.g., selectively reducing) an entropy of the key sequence divided by a bit length of the key sequence or a portion of the key sequence for which the entropy is determined (briefly: per-bit-entropy of the key sequence or key entropy). The key entropy may be changed according to the determined level of ciphering, preferably not involving a change in the length of a secret key that initiates (or seeds) the generation module 104.

Figure 3:
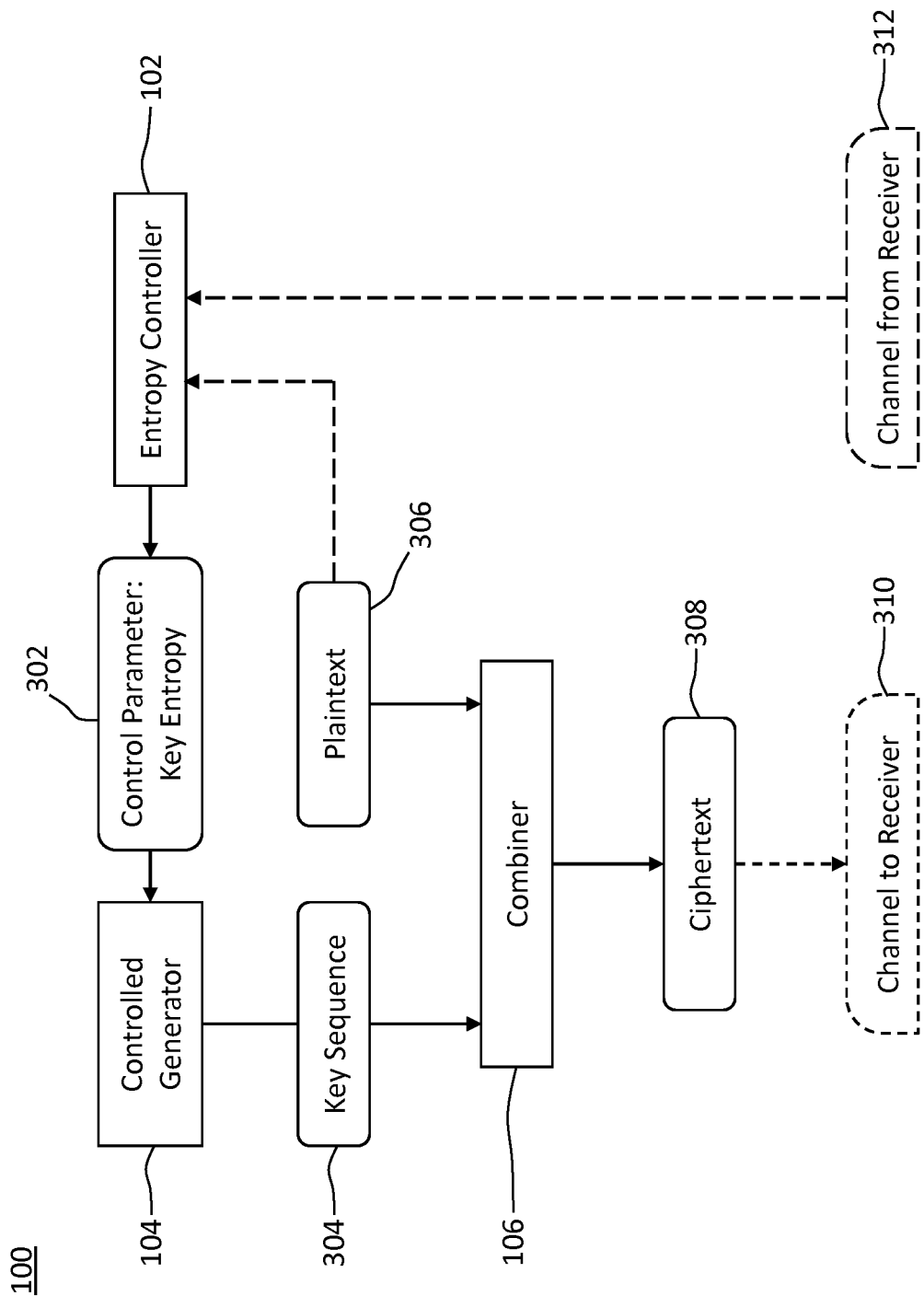
FIG. 3 shows a schematic block diagram for a first embodiment of the device of FIG. 1.

FIG. 3 shows a schematic block diagram for a first embodiment of the device 100. The per-bit-entropy 302 of the key sequence (shortly: key entropy) is included or implied by the determined level of ciphering as a control parameter. That is, the determination module 102 controls the key entropy 302 of the key sequence 304.

By way of example, the first embodiment in FIG. 3 implements a transmitter, i.e., plaintext 306 is the source data and ciphertext 308 is the target data to be transmitted on a channel 310 to a receiver. For example, at the corresponding first embodiment of the device 100 at the receiver, only the roles of plaintext and ciphertext are interchanged.

Embodiments of the technique may maintain compatibility with at least one of the documents 3GPP TS 35.206, 3GPP TS 35.207, 3GPP TS 35.208, 3GPP TS 35.216, 3GPP TS 43.020, 3GPP TS 55.236 and 3GPP TR 21.905 (e.g., Version 14.0.0 in each case), e.g., if a maximum level of ciphering is determined in the step 202, e.g., if the key entropy is 1 or not reduced relative to an existing key entropy.

The technique is applicable for aircrypto, i.e., for encryption and decryption at a radio interface. Particularly, the technique may be applied at base stations and radio devices, e.g., whenever each of the base station (e.g., a packet data convergence protocol, PDCP, layer of an existing eNodeB or gNodeB) and the radio device (e.g., an UE, particularly an IoT device) accessing the base station comprises an embodiment of the device 100.

The key entropy 302 may be greater than zero, preferably greater than 0.5. The key entropy 302 may be less than or equal to 1. That is, the key entropy may be in the range (0, 1], preferably in the range (0.5, 1]. A higher level of ciphering, i.e., a stronger protection against attacks, may be achieved by a greater value of the key entropy 302, e.g., in the range [0.9, 1]. A computationally more efficient ciphering, i.e., saving computational resource, may be achieved by a lower level of ciphering corresponding to a lower value of the key entropy 302, e.g., in the range [0.6, 0.8].

In first variant compatible with any embodiment, the determination module 102 determines the key entropy 302 based on the plaintext 306. For example, the determination module 102 may determine an indicator for the plaintext 306, e.g., at least one of a Quality of Service (QoS), a QoS class identifier (QCI), a service priority, a service identifier, a content type and a content-provider identifier for the plaintext 306. Any one or a combination of the indicators may be associated with the key entropy 302. For example, plaintext 306 comprising electronic mail may be associated with a higher level of ciphering. Moreover, plaintext 306 comprising a video stream (particularly from a public video streaming provider such as "YouTube") may be associated with a lower level of ciphering.

In second variant compatible with any embodiment or the first variant, the determination module 102 determines the key entropy 302 based on a feedback channel 312 from the receiver of the ciphertext 308.

While the technique is described herein for a transmitter implementation of the device 100 for the sake of clarity and brevity, the ciphering technique is directly applicable for a receiver implementation of the device 100. In the receiver implementation, the channel 310 may provide the source data for the method 200. Alternatively or in addition, the receiver implementation of the device 100 may receive through a control channel a control message indicative of the level of ciphering to be applied in the step 202 for decrypting the source data in the steps 204 and 206.

In any embodiment, by determining the key entropy 302 in the step 202 and controlling the generating of the key sequence 304 according to the determined key entropy in the step 204, less computational resources can be used for the ciphering of at least some cases of plaintext 306. Since the length of the secret key that initiates (or seeds) the generation module 104 is preferably not reduced when reducing the key entropy of the key sequence 304, which is output by the generation module 104, an attack might have an improved chance of guessing portions of the plaintext 306, as described below, but the chance of breaking the secret key is not reduce.

The device 100 functions as a cipher (e.g., a stream cipher) by generating a pseudorandom key sequence 304 and combining the key sequence 304 (typically using an XOR operation) with the plaintext 306 to produce the ciphertext 308. Since for each bit of the plaintext 306 a bit of key sequence 304 is generated, each byte of the plaintext 306 is transformed into one of 256 different value depending on the instance of the associated byte in the key sequence. An attacker wanting to approximate or guess the original byte of the plaintext 306 has only a chance of 1/256=0.39% to succeed, assuming the bytes of the key sequence 304 are independently and uniformly distributed according to both conditions 1 and 2 (i.e., key entropy is 1).

When the key entropy 304 is reduced by a factor f (i.e., to a value 1/f), efficiently decrypting the entire ciphertext 308 without knowledge of the secret key is still almost impossible, since the length of the secret key is not reduced. Only the chance of successful approximating or guessing a portion of the ciphertext 308, e.g., a byte of the ciphertext 308, is increased, e.g., to f·0.39%.

Moreover, the computationally most demanding part of ciphering is the production of entropy in the key sequence 304. By reducing the key entropy 302 of the key sequence 304, it is possible to cipher f bytes of the source data on average with the computational effort that is conventionally needed for ciphering one byte of the source data.

In any embodiment, the step 204 of generating the key sequence according to the determined level of ciphering may comprise a step of mapping a generator sequence to the key sequence. The mapping may be injective. The mapping may decrease the per-bit-entropy, $H_{out}$, of the key sequence 304 as compared to the per-bit-entropy of the generator sequence, $H_{in}=f \cdot H_{out}$, e.g., by increasing a bit length by the factor f. The generator sequence is preprocessed by the mapping, which produces the degenerated key sequence 304. On average, each m bits of the key sequence 304 are produced from n bits of the generator sequence, such that n<m=f·n.

An injective mapping that reduces the per-bit-entropy is also referred to as diluting or a dilution. The key sequence may be referred to as diluted or degenerated, e.g., relative to the generator sequence or any random sequence. The technique may be referred to as a diluted ciphering, e.g., a diluted stream ciphering.

By not reducing the secrete key that initiates (or seeds) the generator module 104, the number of brute-force attacks needed on average to reveal the secret key is not reduced. Hence, breaking the secret key is not necessarily easier because of the dilution. Rather, an attacker may have a slightly better chance of successfully guessing some bytes of the plaintext 306 because of the dilution, since the mutual information between the plaintext 306 and the ciphertext 308 is not zero, if the key entropy 302 of the key sequence 304 has been reduced to be less than 1. The chance of successfully guessing some bytes of the plaintext 306 may be further reduced, for example, by randomly determining one or more parameters of the dilution for the embodiments of the device 100 in radio communication.

In contrast, as a comparative example, reducing the length of the secret key would reduce the number of brute-force attacks needed on average for finding the secret key, in which case the encryption would be completely broken. That is, reducing the length of the secret key jeopardizes the entire plaintext 306 and not a limited portion of the plaintext 306. In embodiments of the technique, successfully revealing a part of the plaintext 306 does not enable an attacker to reveal the remaining part of the plaintext 306. That is, even if an attacker is successful with some bytes, the encryption is not completely broken.

Figure 4:
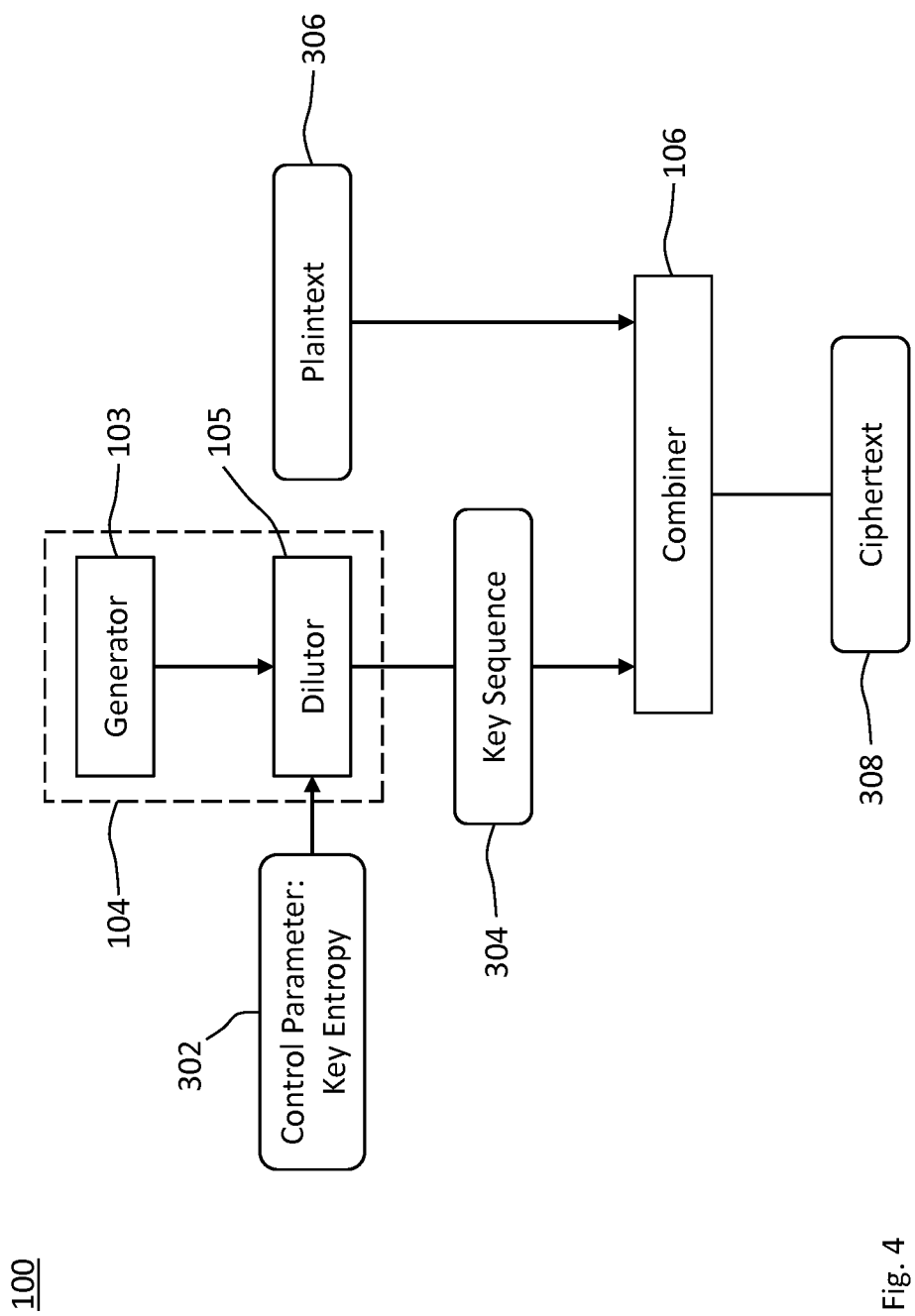
FIG. 4 shows a schematic block diagram for a second embodiment of the device of FIG. 1.

FIG. 4 shows a schematic block diagram for a second embodiment of the device 100. The second embodiment may be a more detailed implementation of the first embodiment. Corresponding features are indicated by like reference signs.

The generator 103 may be a random number generator (e.g., a pseudo-random number generator), which takes a secret key as a seed value or initial value, and generates a generator sequence. The generator sequence may be continuous or arbitrary long, e.g. a generator stream for implementing a stream cipher. While a period of the generator 103 may be finite due to a finite internal state space of the generator 103, the generator 103 may be re-seeded within its period. A Mersenne Twister is an example for the generator 103. The generator sequence (e.g., the generator stream) is mapped to the key sequence 304 (e.g., the key stream) by a dilutor 105 that reduces the per-bit-entropy of the key sequence 304 according to the determined key entropy 302.

The technique may be implemented in the context of, e.g., as an extension of, an existing ciphering architecture. Conventionally, 3GPP has defined 3 ciphering mechanisms in radio communication standards for 3GPP UMTS and 3GPP LTE, namely EEA1, EEA2 and EEA3 using the algorithms Snow3G, AES-CTR and ZUC, respectively. Each of these ciphering mechanisms comprises a stream cipher. A key stream, as conventionally generated by any one of these ciphering mechanisms (and normally combined directly with the plaintext), may serve as the generator stream that is input to the dilutor 105. The conventional key stream is diluted by the dilutor 105. That is, the generator 105 generates (e.g., on average) m bits from each n bits of the generator steam that is output by the generator 103, wherein m>n. The key stream 304, i.e., the diluted or degenerated generator stream, is combined (e.g., by a binary XOR operation) with the plaintext 306.

Any implementation of the second embodiment uses a mapping for the dilution in the step 204 of the method 200. Herein, the mapping is generically referred to by reference sign 504.

Figure 5:
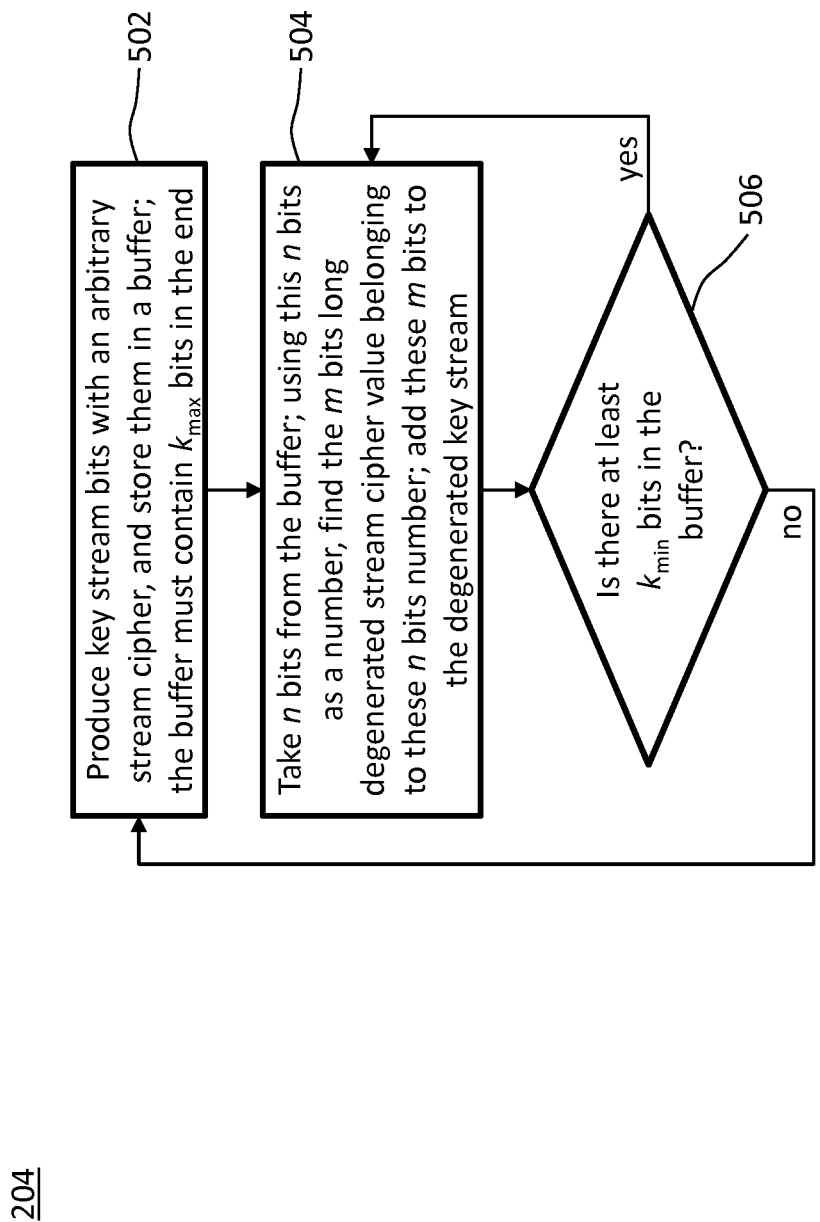
FIG. 5 shows a flowchart for a first implementation of the method of FIG. 2.

FIG. 5 shows a flowchart for a first implementation of the step 204 of generating the key sequence 304. The generator 103, which is referred to as a stream cipher in FIG. 5, produces a key stream as the generator sequence in a substep 502 of the step 204. The key stream is used to fill $k_{max}$ bits into a buffer.

The generator sequence comprises, or is interpreted as, a sequence of generator symbols each having n bits. That is, the generator symbols have a fixed (i.e., equal) number of bits.

The generator sequence is diluted by mapping the generator symbols to key symbols in a substep 504 of the step 206. Each key symbol has m bits, wherein n<m. The sequence of key symbols defines the key sequence 304.

The substep 506 of the step 204 verifies that the buffer comprises at least n bits for the substep 504. Otherwise, the buffer is refilled in the substep 502. The parameters n, m, $k_{min}$ and $k_{max}$ are preset values such that $n \leq k_{min} < k_{max}$, and n<m.

Figure 6:
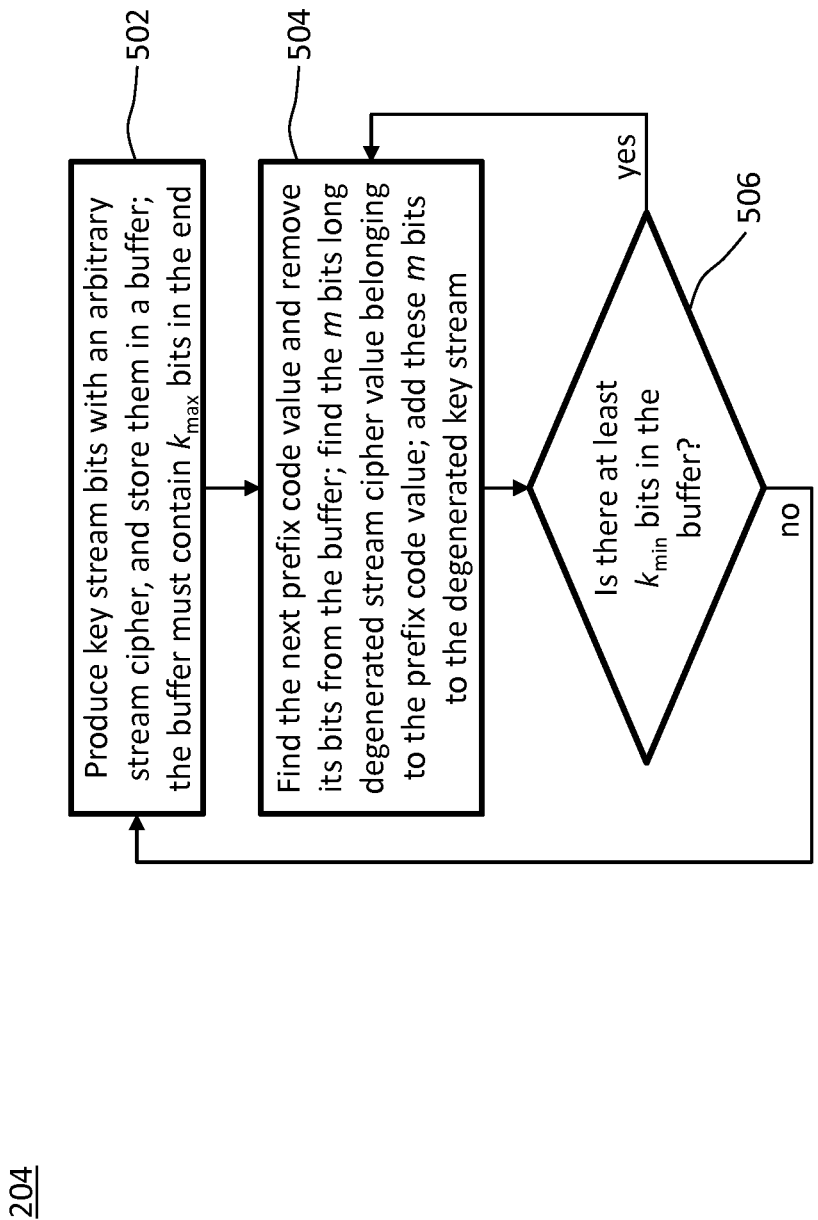
FIG. 6 shows a flowchart for a second implementation of the method of FIG. 2.

FIG. 6 shows a flowchart for a second implementation of the step 204 of generating the key sequence 304. The substeps 502 and 506 correspond to those of the first implementation.

The generator 103, which is referred to as stream cipher in FIG. 6, produces a key stream as the generator sequence. Adjacent (i.e., consecutive) sequences of bits in the generator sequence are interpreted as generator symbols. The generator symbols of the generator sequence are code words of a prefix code. The generator symbols have a varying (i.e., unequal) number of bits.

An average bit length of the generator symbols is n. On average, the generator sequence is diluted by mapping each generator symbol to a key symbols. Each key symbol has m bits, wherein n<m. In other words, the average bit length, n, of the generator symbols is less than the bit length m of the key symbols. The sequence of key symbols defines the key sequence 304.

The substep 506 of the step 204 verifies that the buffer comprises at least $n_{max}$ bits for the substep 504. Otherwise, the buffer is refilled in the substep 502. The parameters m, $k_{min}$ and $k_{max}$ are preset values such that $k_{min} < k_{max}$ and $k_{min}$ is greater than the length, $n_{max}$, of the longest code word of the prefix code.

In any implementation of the step 204, the mapping of the generator symbols to the key symbols may be injective. That is, different generator symbols are mapped to different key symbols.

The number of key symbols may be C. The set of all key symbols is also referred to as a key symbol alphabet. That is, the cardinality of the key symbol alphabet is C. The prefix code may comprise C code words. The mapping may be bijective.

By reducing the key entropy 302, represented by $H_{out}$, of the key sequence 304 by a factor f compared to the generator entropy, $H_{in}$, of the generator sequence, it is possible to cipher more than one byte (e.g., f bytes on average) of the source data with each byte of the generator sequence. An average bit-rate for the generator sequence at the input of the mapping (i.e., at the input of the dilutor 105) may be less than an average bit-rate for the key sequence at the output of the mapping (i.e., at the output of the dilutor 105).

Figure 7:
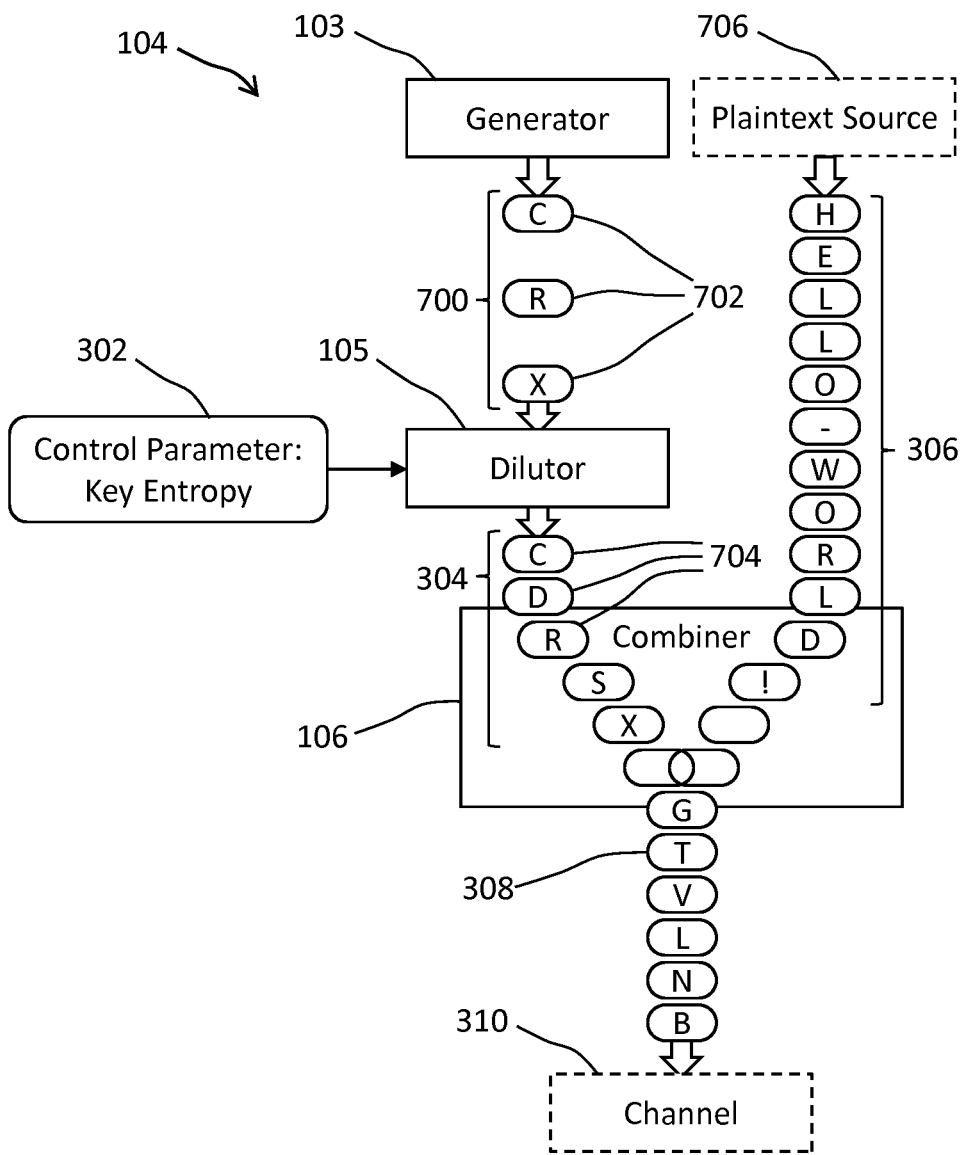
FIG. 7 schematically illustrates a dilution effect in an embodiment of the device of FIG. 1.

FIG. 7 schematically illustrates the dilution in an embodiment of the device 100. The dilution factor is f=m/n>1 with a number (e.g., a mean number) of n input bits per generator symbol 702 and a number (e.g., a mean number) of m output bits per key symbol 704. The injective mapping in the dilutor may correspond to a reduction of the per-bit-entropy to $H_{out} = H_{in}/f$. The generator entropy may be $H_{in} = H_{max} = 1$.

Diluting the generator sequence resulting in the key sequence 304 enables increasing the bit-rate for the key sequence 304 by the factor f without increasing the bit-rate for generating the generator sequence 700, the latter being computationally expensive. Since the computational resources for the combining 206 are unchanged (and typically negligible), and since the bit-rate of the key sequence 304 is typically related to the bit-rate of both the plaintext 306 and the ciphertext 308 (i.e., the ciphering bit-rate), the computational requirements for a given ciphering bit-rate are reduced. For example, in the combiner 106, x bits of the key sequence 304 are combined with x bits of the plaintext 306, wherein x may be any integer number depending on the implementation. For clarity of the illustration and not limitation, the combination 206 is illustrated for x=m in FIG. 7.

Examples of a mapping with equally sized generator symbols, e.g. as examples of the first implementation of the step 204, are described.

In order to map a fixed number of n bits injectively, the number C of generator symbols has to be $2^n$. If condition 1 is to be fulfilled by the key sequence 304, i.e., the bit flip probability is 0.5 for each bit, a key symbol alphabet comprising Cm-bit symbols is defined as the C key symbols 704, so that the expectation value for the x-th bit is 0.5 when averaged over all C key symbols 704, for any given for x=0 . . . m−1.

The key symbol alphabet is a subset of the $2^m$ possible m-bit symbols, which is defined by either grouping m-bit symbols comprising exactly q 1's in a group $G_{q+}$, or by grouping m-bit symbols comprising exactly q 0's in a group $G_{q-}$, since evidently $G_{q-} = G_{m-q+}$. By using one or more complete groups, different bit positions are equally distributed. In order to eliminate a bias, i.e., for probability p=0.5, groups $G_{q+}$ and $G_{q-}$ are combined.

The groups are shown in below tables for m=4.

| Group with q = 0 bits being set to 1: (4 over 0) = 1 symbol | 0 | 0 | 0 | 0 | ($G_{0+}$) |
|---|---|---|---|---|---|
| Group with 1 bit set: (4 over 1) = 4 symbols | 0 | 0 | 0 | 1 | ($G_{1+}$) |
| | 0 | 0 | 1 | 0 | |
| | 0 | 1 | 0 | 0 | |
| | 1 | 0 | 0 | 0 | |

-continued

| | | | | | |
|---|---|---|---|---|---|
| Group with q = 2 bits being set to 1: (4 over 2) = 6 symbols | 0 0 1 1 0 1 | 0 1 0 0 1 1 | 1 0 0 1 1 0 | 1 1 1 0 0 0 | ($G_2$) |
| Group with q = 3 bits being set to 1: (4 over 3) = 4 symbols | 0 1 1 1 | 1 0 1 1 | 1 1 0 1 | 1 1 1 0 | ($G_{1-}$) |
| Group with q = 4 bits being set to 1: (4 over 4) = 1 symbol | 1 | 1 | 1 | 1 | ($G_{0-}$) |

By combining the groups symmetrically, $G_{q+}$ and $G_{q-}$, into the key symbol alphabet, the combination comprises the m-bit symbols with q 0's or q 1's. For m-bit symbols as the key symbols 704, there are m/2+1 or (m+1)/2 of such symmetric combinations for even and odd m, respectively.

Those combinations the cardinality of which is a power of 2, i.e., $C=2^n$, can be used as key symbol alphabets for the mapping 504 with fixed-sized generator symbols 702, wherein n is the fixed bit length of the generator symbols 702. Combinations for the example m=4 are listed in the below table.

| Number q of 0's or 1's | Cardinality C |
|---|---|
| $G_{0+}$ and $G_{0-}$: q = 0 | 2 |
| $G_{1+}$ and $G_{1-}$: q = 1 | 8 |
| $G_2$: q = 2 | 6 |

$G_2$ is not directly usable for a fix-sized mapping. Hence, the following key symbol alphabets can be defined for the example m=4:

| Number q of 0's or 1's | Used groups | Cardinality C = $2^n$ | Dilution |
|---|---|---|---|
| $G_{0+}$ and $G_{0-}$: q = 0 | $G_{0+}$ and $G_{0-}$ | 2 | 1:4 (max. dilution) |
| $G_{1+}$ and $G_{1-}$: q = 1 | $G_{1+}$ and $G_{1-}$ | $8 = 2^3$ | 3:4 (modest dilution) |
| $G_2$: q = 2 | All groups | $2^m$ | 4:4 (no dilution) |

The dilution of the per-bit-entropy, that is the reduction of the key entropy $H_{out}$ relative to the generator entropy $H_{in}=1$, is caused by the violation of the condition 2, i.e. correlated bit flipping. The key symbol alphabet $G_{0+}$ and $G_{0-}$ has maximum correlation, i.e., either all m bits a flipped or all are unchanged, which achieves a dilution factor f=4. The key symbol alphabet $G_{0+}$ and $G_{0-}$ has a weaker correlation between cyclically neighboring bits, which achieves a dilution factor f=1.3. Using all groups, i.e., m=n, is the identity mapping, which corresponds to no dilution (f=1).

The group $G_2$ in above example for m=4 cannot be used for a mapping 504 with equally sized generator symbols. In general, a prefix code as the generator symbols 702 may be used to injectively map C generator symbols 702 to C key symbols, e.g. if C is not a power of 2.

The prefix code may be defined in accordance with a Huffman tree, regardless of whether an implementation traverses the Huffman tree or stores the prefix code for rapid look-up in a table.

Figure 8:
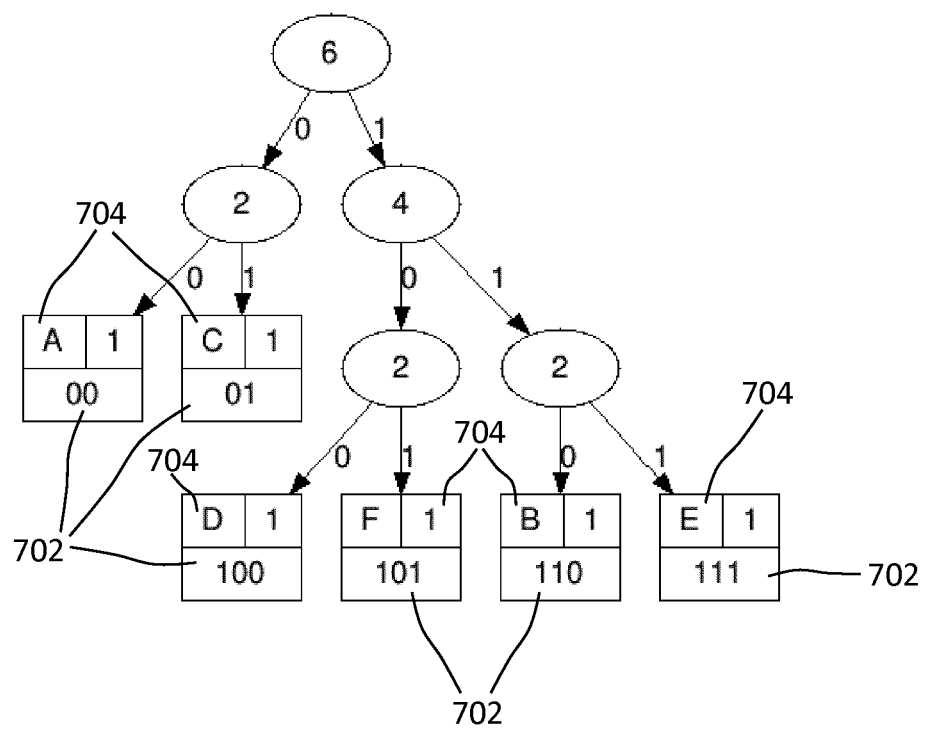
FIG. 8 schematically illustrates a first example of a mapping, which can be performed by any embodiment of the device of FIG. 1.

The prefix code defined by means of a Huffman tree approximates the probability distribution used to construct the Huffman tree. FIG. 8 shows a first embodiment of a Huffman tree 800 for defining the mapping 504 for the dilution in the step 204 with a variable number of input bits per generator symbol 702, e.g. as a first example of the second implementation of the step 204.

Labeling the C=6 key symbols 704 of the group $G_2$ in above example for m=4 by A, B, C, D, E and F, and constructing a Huffman tree 800 for equal probabilities, as illustrated in FIG. 8, the associated code words 702 are the generator symbols for the mapping 504. In other words, the Huffman tree 800 is used as decompressor that generates an equal distribution of A, B, C, D, E and F (e.g., up to deviations caused by the finite size of C).

For explanation and without limitation, the mapping 504 of C=6 different 4-bit key symbols 704 is defined in below table.

| Leaf in FIG. 8 | Input Dilutor | Output Dilutor | | | |
|---|---|---|---|---|---|
| A | 00 | 0 | 0 | 1 | 1 |
| B | 110 | 0 | 1 | 0 | 1 |
| C | 01 | 1 | 0 | 0 | 1 |
| D | 100 | 0 | 1 | 1 | 0 |
| E | 111 | 1 | 0 | 1 | 0 |
| F | 101 | 1 | 1 | 0 | 0 |

The left column is merely for reference to FIG. 8 and can be omitted in an implementation. The center column comprises the generator symbols 702, which are code words of a prefix code. The right column comprises the key symbols 704.

Below table shows that the equally distributed key symbols 704 (each having probability 1/6) yields an unbiased (i.e., p=0.5) and equal distribution of bit flips.

| Leaf in FIG. 8 | Symbol Probability | Bit Flip Probability | | | |
|---|---|---|---|---|---|
| A | $p_A$ = 1/6 | 0 | 0 | 1/6 | 1/6 |
| B | $p_B$ = 1/6 | 0 | 1/6 | 0 | 1/6 |
| C | $p_C$ = 1/6 | 1/6 | 0 | 0 | 1/6 |
| D | $p_D$ = 1/6 | 0 | 1/6 | 1/6 | 0 |
| E | $p_E$ = 1/6 | 1/6 | 0 | 1/6 | 0 |
| F | $p_F$ = 1/6 | 1/6 | 1/6 | 0 | 0 |
| Sum: | p = 1 | 1/2 | 1/2 | 1/2 | 1/2 |

The mean generator symbol length is n=2.67. That is, the effective dilution is 2.67:4 or f=1.5, which approximates the theoretical dilution ($\log_2 C$):4=2.58:4 for C=6. This example of the mapping 504 fulfills condition 1 and reduces the entropy to $H_{out}=1/f$ by violating condition 2. More specifically, the bit flips are correlated in that arbitrary pairs of 2 bits are flipped.

An example for the dilution (i.e., the mapping at the level of sequences) for above mapping 504 is described. The generator sequence 700, i.e., the random bit string, is 1 000 1 010 1 1 010, wherein spaces are added at the end of each generator symbol 702 for readability. The resulting key sequence 704, i.e., the diluted key stream, is 000 100 000 001 000 000 001. Hence, a generator sequence with an input length of 13 bits has been diluted to a key sequence with an output length of 21 bits.

While above example of a mapping 504 for the dilution (e.g., an example of the second implementation of the step 204 in the second embodiment) uses a Huffman tree 800 for defining the generator symbols 702 as a prefix code, any other prefix code may be used as well in the mapping 504.

Moreover, while above example of a mapping 504 for the dilution (e.g., as the first example of the second implementation of the step 204 in the second embodiment) uses a Huffman tree 800 to reduce entropy by violating condition 2, the generator symbols defined by a Huffman may also generate entropy by violating condition 1.

Figure 9:
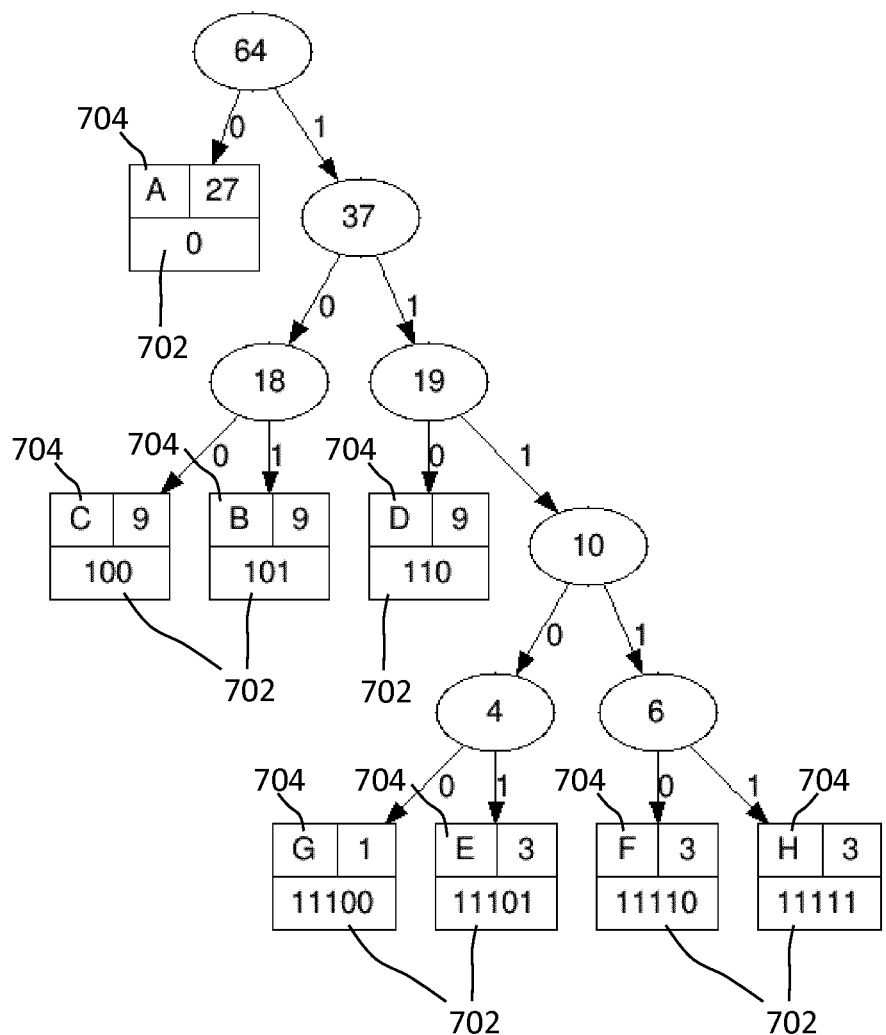
FIG. 9 schematically illustrates a second example of a mapping, which can be performed by any embodiment of the device of FIG. 1.
Figure 10:
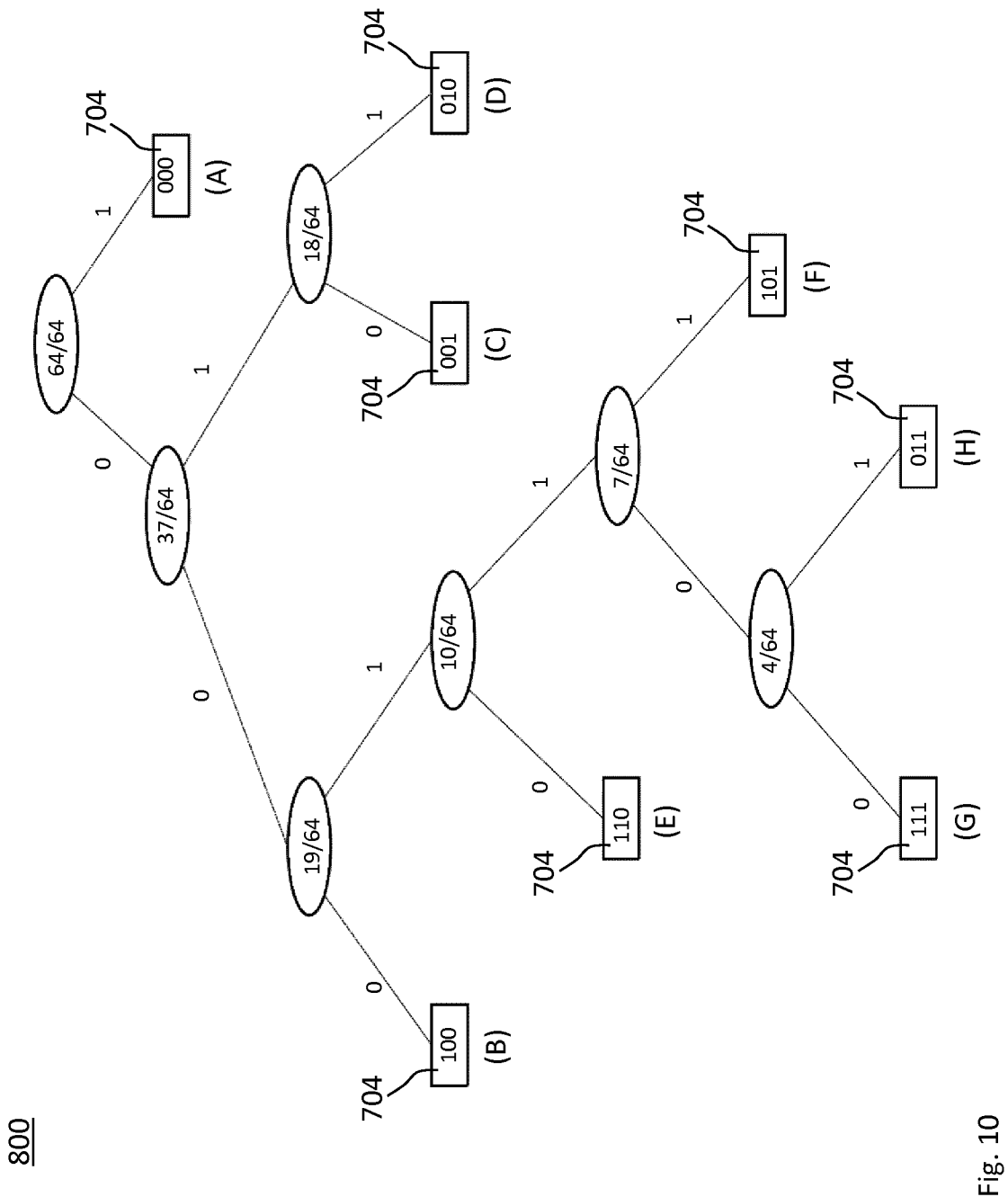
FIG. 10 schematically illustrates a third example of a mapping, which can be performed by any embodiment of the device of FIG. 1.

FIGS. 9 and 10 show examples of Huffman trees 800 for variants of a second example for the mapping 504 with variable number of input bits as the generator symbols 702, e.g., as second examples of the second implementation of the step 204.

Violating the condition 1 means a biased bit flipping probability, $p \neq \frac{1}{2}$, i.e., a probability distribution for the individual bit values that is asymmetric with respect to 0 and 1. The probability distribution $p_A, \ldots, p_H$ for the key symbols 704 is listed in below table for the example m=3 and bit flipping probability $p=\frac{1}{4}$.

| Leaf in FIG. 9 | Bit Length | Probability | Bit Flip Probability | | |
|---|---|---|---|---|---|
| A | 1 | $p_A$ = 27/64 | 0 | 0 | 0 |
| C | 3 | $p_C$ = 9/64 | 0 | 0 | 9/64 |
| D | 3 | $p_D$ = 9/64 | 0 | 9/64 | 0 |
| B | 3 | $p_B$ = 9/64 | 9/64 | 0 | 0 |
| H | 5 | $p_H$ = 3/64 | 0 | 3/64 | 3/64 |
| F | 5 | $p_F$ = 3/64 | 3/64 | 0 | 3/64 |
| E | 5 | $p_E$ = 3/64 | 3/64 | 3/64 | 0 |
| G | 5 | $p_G$ = 1/64 | 1/64 | 1/64 | 1/64 |
| 2.47 Mean Length | | Sum: | 1/4 | 1/4 | 1/4 |

The dilution 1/f=2.47:3=0.82 approximates the theoretical reduced entropy of the key sequence comprising an uncorrelated bit stream with a bit flip probability of 25%:

$$H = -p \cdot \log p - (1-p) \cdot \log(1-p) = 0.81 \text{ for } p = 0.25.$$

Any implementation of the step 204 may reduce the key sequence 304, $H_{out} < 1$, by deviating from the conditions 1 and 2 independently. The above example reduces the key entropy 302 by maintaining the condition 2 of equally distributed and uncorrelated bit flips and rescinding the condition 1 of 50% bit flip probability.

Above example in FIG. 9 uses an optimal Huffman tree 800, i.e., the average bit length n of the generator symbols 702 is minimal. The longest bit length of the generator symbols 702 is $n_{max}=5$.

The corresponding mapping 504 is listed in below table.

| Leaf in FIG. 9 | Input Dilutor | Output Dilutor | | |
|---|---|---|---|---|
| A | 0 | 0 | 0 | 0 |
| C | 100 | 0 | 0 | 1 |
| D | 110 | 0 | 1 | 0 |
| B | 101 | 1 | 0 | 0 |
| H | 11111 | 0 | 1 | 1 |
| F | 11110 | 1 | 0 | 1 |
| E | 11101 | 1 | 1 | 0 |
| G | 11100 | 1 | 1 | 1 |

So at the input of the dilutor 105 are pseudo random bits with maximum entropy $H_{in}=1$, i.e., identically distributed and uncorrelated bits according to condition 2 and 50:50 bit flip probability according to condition 1. The dilutor 105 outputs as the key sequence 304 identically distributed and uncorrelated bits according to condition 2 with a 25:75 bit flip probability violating condition 1, thus reducing the key entropy to $H_{out}=0.81<1$.

Also a sub-optimal prefix code (other than or similar to a Huffman tree) may be applied. An example for a sub-optimal tree 800 yielding an effective dilution of 2.48:3 is illustrated in FIG. 10. The longest bit length of the generator symbols 702 is $n_{max}=6$.

The corresponding mapping 504 is listed in below table.

| Leaf in FIG. 10 | Input Dilutor | Output Dilutor | | |
|---|---|---|---|---|
| A | 1 | 0 | 0 | 0 |
| C | 010 | 0 | 0 | 1 |
| D | 011 | 0 | 1 | 0 |
| B | 000 | 1 | 0 | 0 |
| H | 001101 | 0 | 1 | 1 |
| F | 00111 | 1 | 0 | 1 |
| E | 0010 | 1 | 1 | 0 |
| G | 001100 | 1 | 1 | 1 |

Any mapping 504 may be implemented by a look-up table comprising C entries. Alternatively or in combination, any mapping 504 may be implemented by a look-up table comprising $2^{n_{max}}$ entries, wherein $n_{max}$ is the maximum number of bits per generator symbol in prefix code, i.e., the depth of the Huffman tree 800.

An exemplary performance of a diluted stream cipher is discussed, e.g. to illustrate the usability of the technique. Below considerations may be applied to any embodiment. The performance comprises security and complexity, which are changed in opposing directions by changing the level of ciphering.

By way of example, the generator symbols 702 comprise n=6 bits for generating a key symbols 704 comprising m=8 bits (i.e., one byte) for generating the degenerated key sequence 304. By reducing n or increasing m, the cipher bit-rate (that is m/n times the generator bit-rate) is increased and security is reduced (according to the reduction of the per-bit-entropy by a factor n/m).

Suppose that at some point, a byte $t_i$ of the plaintext is sent. An attacker receives the corresponding portion c of the ciphertext 308 and tries to reveal the message portion $t_i$. Let the a priori probability of $t_i$ be $p(t_i)$, the probability of sending the byte c be $p(c)$. Let the byte in the key sequence 304 used for encrypting $t_i$ be $k_i$, e.g., the combining 206 comprises the XOR operation $t_i \oplus k_{i=c}$. By way of example, each key symbol 704 is selected with equal probability, i.e. $p(k_i) = p(k) = 1/C = 1/2^n$. Moreover, let $T_c$ be the set of $t_j$ values, which can be encrypted to c, i.e.:

$$T_c = \{t_j : \forall k_j, t_j \oplus k_j = c\}.$$

The attacker may take a Bayes action, wherein the a posteriori probability, i.e., the probability for a plaintext byte $t_i$ given the received portion c of the ciphertext, is:

$$p(t_i \mid c) = \frac{p(c \mid t_i) \cdot p(t_i)}{p(c)} = \frac{p(k_i) \cdot p(t_i)}{\sum_{j: t_j \in T_c} p(k_j) \cdot p(t_j)} = \frac{p(k) \cdot p(t_i)}{p(k) \sum_{j: t_j \in T_c} p(t_j)} = \frac{p(t_i)}{\sum_{j: t_j \in T_c} p(t_j)} = \frac{p(t_i)}{p(T_c)}. \quad \text{(Eq. 1)}$$

Clearly, the attacker must select the plaintext byte with the highest probability. Moreover, the probability of a correct approximation is the probability of $t_i$ divided by the probability of sending an element of the set $T_c$, which is also clear. However, the simple Eq. 1 indicates a weakness, if the bytes of the plaintext 306 have a very unequal probability distribution. For some ciphertext byte c, the set $T_c$ may comprise only one or a few elements with relatively high probability, in which case an attacker has a high chance of finding the ciphertext byte c. However, revealing such a portion of the ciphertext 308 does not reveal future bytes of the key sequence. Furthermore, the attacker must know the correct distribution of the plaintext bytes, which is usually not the case.

On the other hand, if the probability distribution of the plaintext bytes is unknown or (e.g., approximately) uniform:

$$p(t_i \mid c) = \frac{p(t_i)}{p(T_c)} = \frac{2^{-m}}{2^{-m+n}} = 2^{-n}.$$

Hence, for the example, the probability of a correct approximation is $$p(t_i \mid c) = \frac{1}{64} = 1.56\%$$

per byte.

The computational resources for generating the degenerated key sequence are discussed. The computational resources depend on implementation and hardware architecture. The following example assumes an AMD64 architecture. Moreover, the limit of generating a large key sequence (e.g., many bytes) is considered, so that the L1 cache is exclusively used by the generating step, and that a good compiler and/or the processor or core can hide the latency of the instructions, thus we can calculate with the reciprocal throughput. While the latter assumption may not be completely correct, it yields an acceptable approximation.

To generate one byte of the degenerated key sequence, first a shift and a mask operation is needed, then a look-up in an array to find the proper m bit long value. If n and m are small enough (e.g., $n \leq 8$, $m \leq 16$), the array can easily fit into L1 cache. Reading L1 cache takes not more than about 4 cycles (i.e., latency), while shift and mask operation takes at most about 2 cycles. Since there will be some parallel execution, it is a conservative approximation that producing a byte takes about or less than 10 cycles.

A further optimized implementation is described. First, instead of generating m=8 bits from n=6, the mapping may be implemented two times for generating 16 bits from 12 bits. This needs an array with $2^{12}$ 16-bit entries, i.e. 8 kilobyte (KB), which still fits into the L1 cache. Load the next 3 bytes, i.e., 24 bits of the generator sequence, into a 32-bit register. The lower 12 bits can be get by masking, while the upper 12 bits need masking, shifting and a register to register copy. Finally, to generate the 2×2 bytes of the degenerated key sequence, two look-up substeps in the array are performed. By considering reciprocal throughputs of, e.g. of the microarchitecture Intel Skylake, this needs 0.5+ 0.5+0.25+0.5+0.25+2·0.5=3 cycles per 4 bytes, i.e. about 1.25 bytes per cycle per core can be reached.

Figure 11:
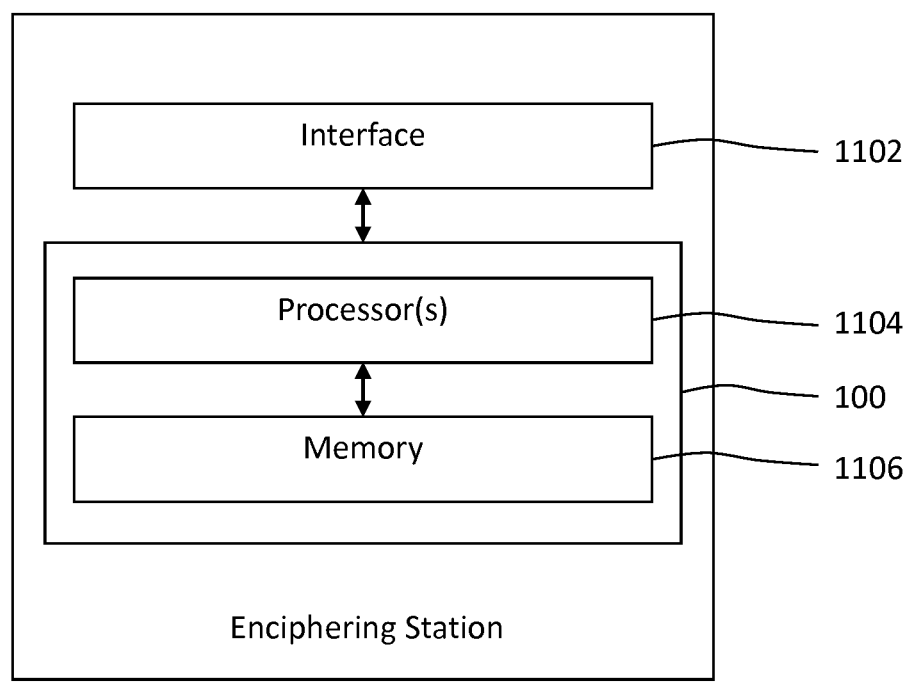
FIG. 11 shows a schematic block diagram of an enciphering embodiment of the device of FIG. 1.

FIG. 11 shows a schematic block diagram for an embodiment of the device 100. The device 100 comprises one or more processors 1104 for performing the method 200 and memory 1106 coupled to the processors 1104. For example, the memory 1106 may be encoded with instructions that implement at least one of the modules 102, 104 and 106.

The one or more processors 1104 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1106, data transmitter functionality. For example, the one or more processors 1104 may execute instructions stored in the memory 1106. Such functionality may include providing various features and steps discussed herein, including any of the benefits disclosed herein. The expression "the device being operative to perform an action" may denote the device 100 being configured to perform the action.

As schematically illustrated in FIG. 11, the device 100 may be embodied by an enciphering station 1100, e.g., a base station or a radio device. The enciphering station 1100 comprises a radio interface 1102 coupled to the device 100 for radio communication with one or more deciphering stations.

Figure 12:
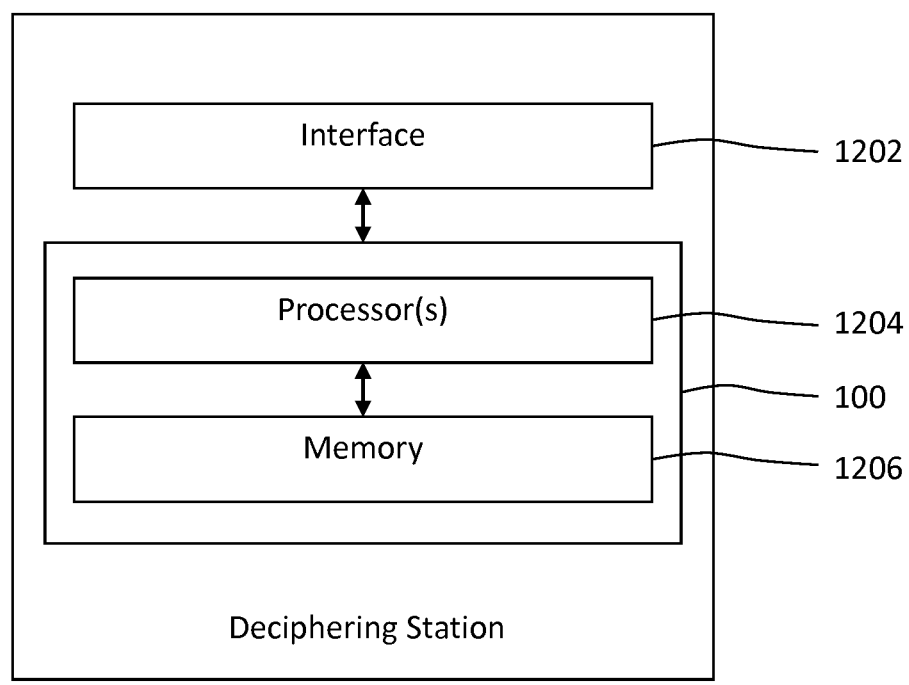
FIG. 12 shows a schematic block diagram of a deciphering embodiment of the device of FIG. 1.

FIG. 12 shows a schematic block diagram for an embodiment of the device 100. The device 100 comprises one or more processors 1204 for performing the method 200 and memory 1206 coupled to the processors 1204. For example, the memory 1206 may be encoded with instructions that implement at least one of the modules 102, 104 and 106.

The one or more processors 1204 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1206, data receiver functionality. For example, the one or more processors 1204 may execute instructions stored in the memory 1206. Such functionality may include providing various features and steps discussed herein, including any of the benefits disclosed herein. The expression "the device being operative to perform an action" may denote the device 100 being configured to perform the action.

As schematically illustrated in FIG. 12, the device 100 may be embodied by a deciphering station 1200, e.g., a base station or a radio device. The deciphering station 1200 comprises a radio interface 1202 coupled to the device 100 for radio communication with one or more enciphering stations.

As has become apparent from above description, embodiments of the technique can encrypt more plaintext with the same amount of a generator sequence. Since generating the generator sequence consumes a significant part, typically the majority, of the computational resources required for the encryption, the embodiments can achieve a higher encryption rate for the price of a weaker encryption. Same or further embodiments can gradually decrease the encryption strength while increasing the encryption rate.

If a too weak encryption was selected and/or a portion of the plaintext was revealed to an attacker, the attacker cannot infer the seed key or future bits of the key sequence, e.g., for a generator entropy being 1 and a period of the generator being longer than the revealed portion, so that the remaining part of the message remains protected.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of ciphering source data into target data, the method comprising:
   determining a level of ciphering for the source data;
   generating a key sequence depending on the determined level of ciphering; wherein
      the level of ciphering comprises or is indicative of a key entropy of the key sequence; wherein the key sequence comprises key symbols out of a key symbol alphabet; wherein the generating the key sequence comprises:
         generating a generator sequence according to a generator entropy that is greater than the determined key entropy; and
         mapping generator symbols of the generator sequence to key symbols of the key sequence; wherein the generator symbols are code words of a prefix code and bit lengths of the generator symbols are different; wherein the key entropy defines a ratio between an average bit length of the generator symbols and a bit length of the key symbols; and
   combining the source data and the key sequence resulting in the target data.

2. The method of claim 1, wherein the determined key entropy for the key sequence is less than 1.

3. The method of claim 1, wherein different bits in the key sequence are correlated depending on the determined key entropy and/or the determined level of ciphering.

4. The method of claim 1, wherein different bits in the key sequence are differently probability-distributed depending on the determined key entropy and/or the determined level of ciphering.

5. The method of claim 1, wherein a probability of a bit in the key sequence for being set to 1 deviates from ½ depending on the determined key entropy and/or the determined level of ciphering.

6. The method of claim 1, wherein a cardinality of the key symbol alphabet and/or the bit length of the key symbols depends on the determined key entropy and/or the determined level of ciphering.

7. The method of claim 1, wherein the key entropy is an increasing function of a cardinality of the key symbol alphabet and/or a decreasing function of the bit length of the key symbols.

8. The method of claim 1, wherein the determined key entropy defines a ratio between a logarithm of a cardinality of the key symbol alphabet and the bit length of the key symbols.

9. The method of claim 1, wherein a cardinality of the key symbol alphabet is less than 2 m, wherein m is the bit length of the key symbols.

10. The method of claim 1, wherein the level of ciphering is changed by the determining without reseeding a generator generating the generator sequence.

11. The method of claim 1, wherein the mapping is injective.

12. The method of claim 1, wherein an average bit length of the generator symbols is less than the bit length of the key symbols.

13. The method of claim 1, wherein the generator entropy is equal to or approximates a maximum entropy.

14. The method of claim 1, wherein a length of a seed key for initializing the generating and/or a length of a period of the generating is not reduced when at least one of the level of ciphering or the key entropy is reduced.

15. The method of claim 1, wherein the ciphering comprises encrypting or decrypting.

16. The method of claim 1, wherein the source data, the target data, and/or a control message is indicative of the level of ciphering.

17. A non-transitory computer readable recording medium storing a computer program product for ciphering source data into target data, the computer program product comprising program instructions which, when run on processing circuitry of one or more computing devices, causes the one or more computing devices to:
   determine a level of ciphering for the source data;
   generate a key sequence depending on the determined level of ciphering; wherein
      the level of ciphering comprises or is indicative of a key entropy of the key sequence; wherein the key sequence comprises key symbols out of a key symbol alphabet; wherein the generating the key sequence comprises:
         generating a generator sequence according to a generator entropy that is greater than the determined key entropy; and
         mapping generator symbols of the generator sequence to key symbols of the key sequence; wherein the generator symbols are code words of a prefix code and bit lengths of the generator symbols are different; wherein the key entropy defines a ratio between an average bit length of the generator symbols and a bit length of the key symbols; and
   combine the source data and the key sequence resulting in the target data.

18. The non-transitory computer readable recording medium of claim 17, wherein an average bit length of the generator symbols is less than the bit length of the key symbols.

19. A device for ciphering source data into target data, the device comprising:
   processing circuitry;
   memory containing instructions executable by the processing circuitry whereby the device is operative to:
      determine a level of ciphering for the source data;
      generate a key sequence depending on the determined level of ciphering,
         wherein the level of ciphering comprises or is indicative of a key entropy of the key sequence, wherein generating the key sequence comprises:
            generating a generator sequence according to a generator entropy that is greater than the determined key entropy; and
            mapping generator symbols of the generator sequence to key symbols of the key sequence; wherein the generator symbols are code words of a prefix code and bit lengths of the generator symbols are different; wherein the key entropy defines a ratio between an average bit length of the generator symbols and a bit length of the key symbols; and
      combine the source data and the key sequence resulting in the target data.

20. The device of claim 19, wherein an average bit length of the generator symbols is less than the bit length of the key symbols.

* * * * *